Patented Dec. 27, 1949

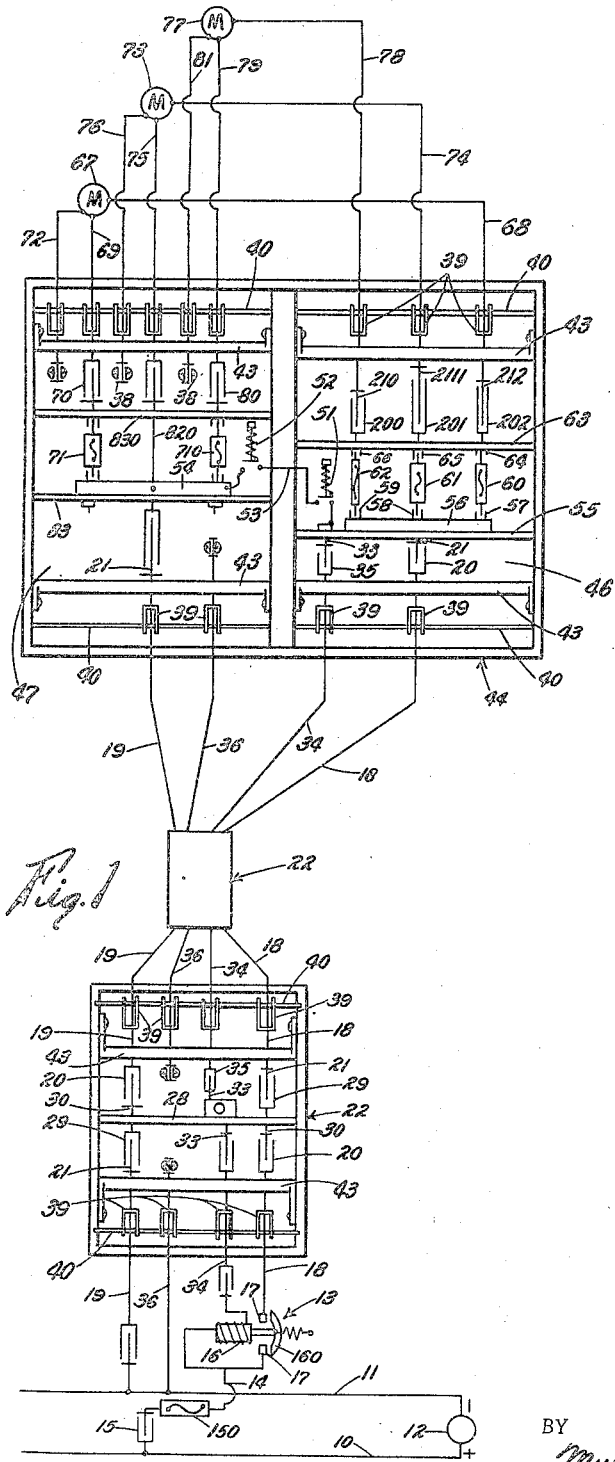

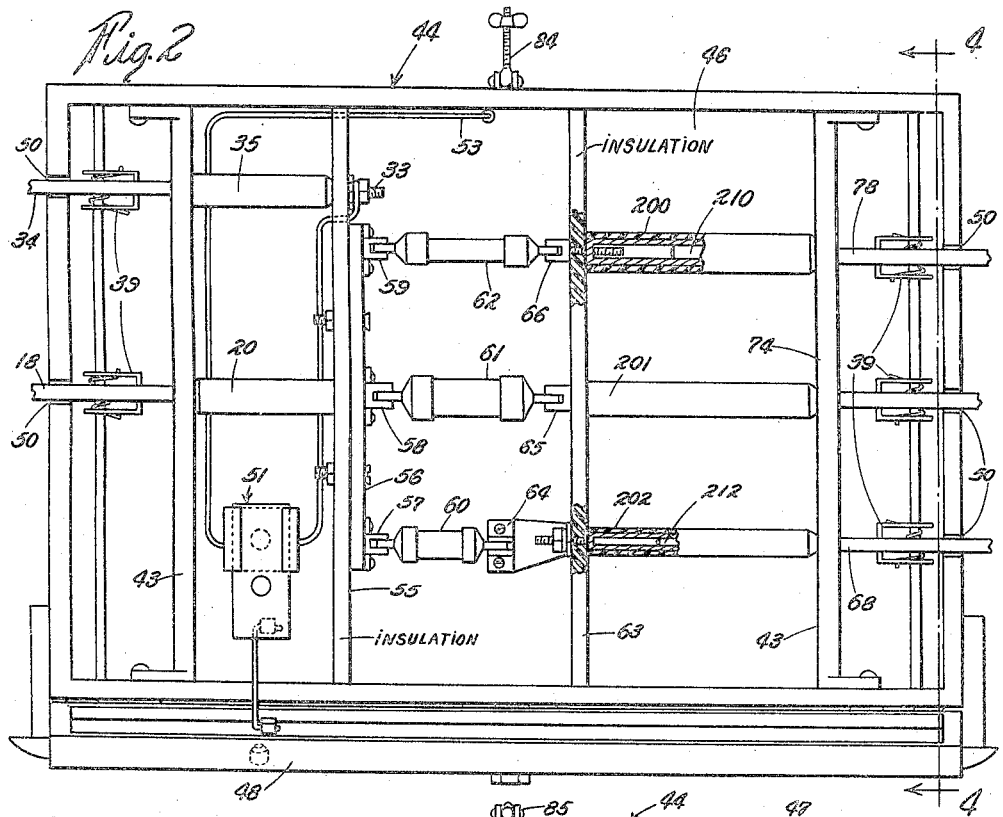
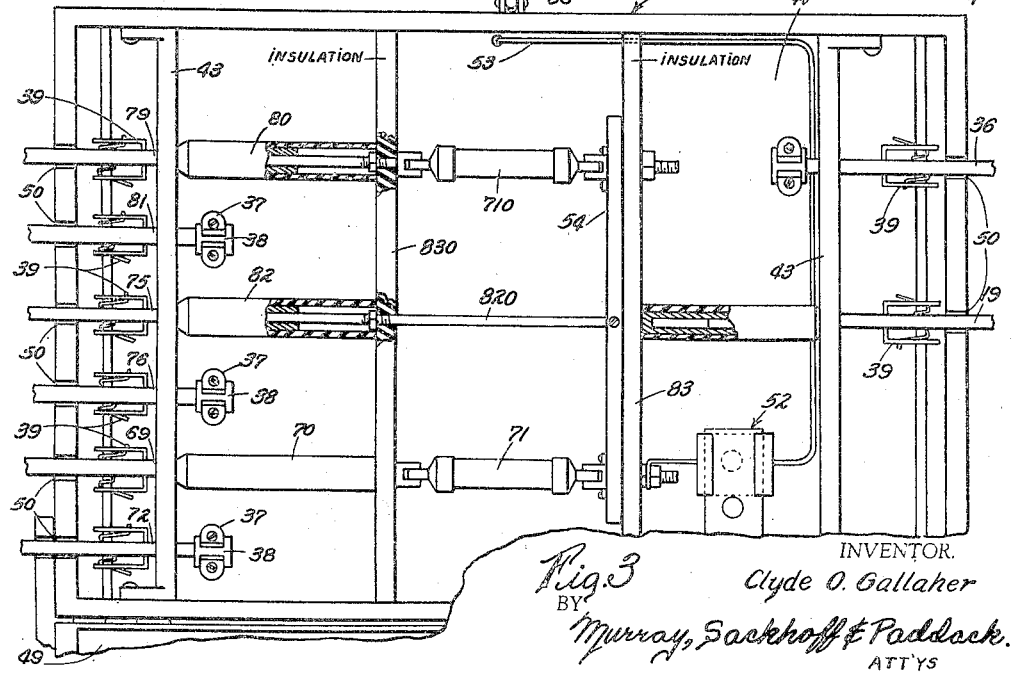

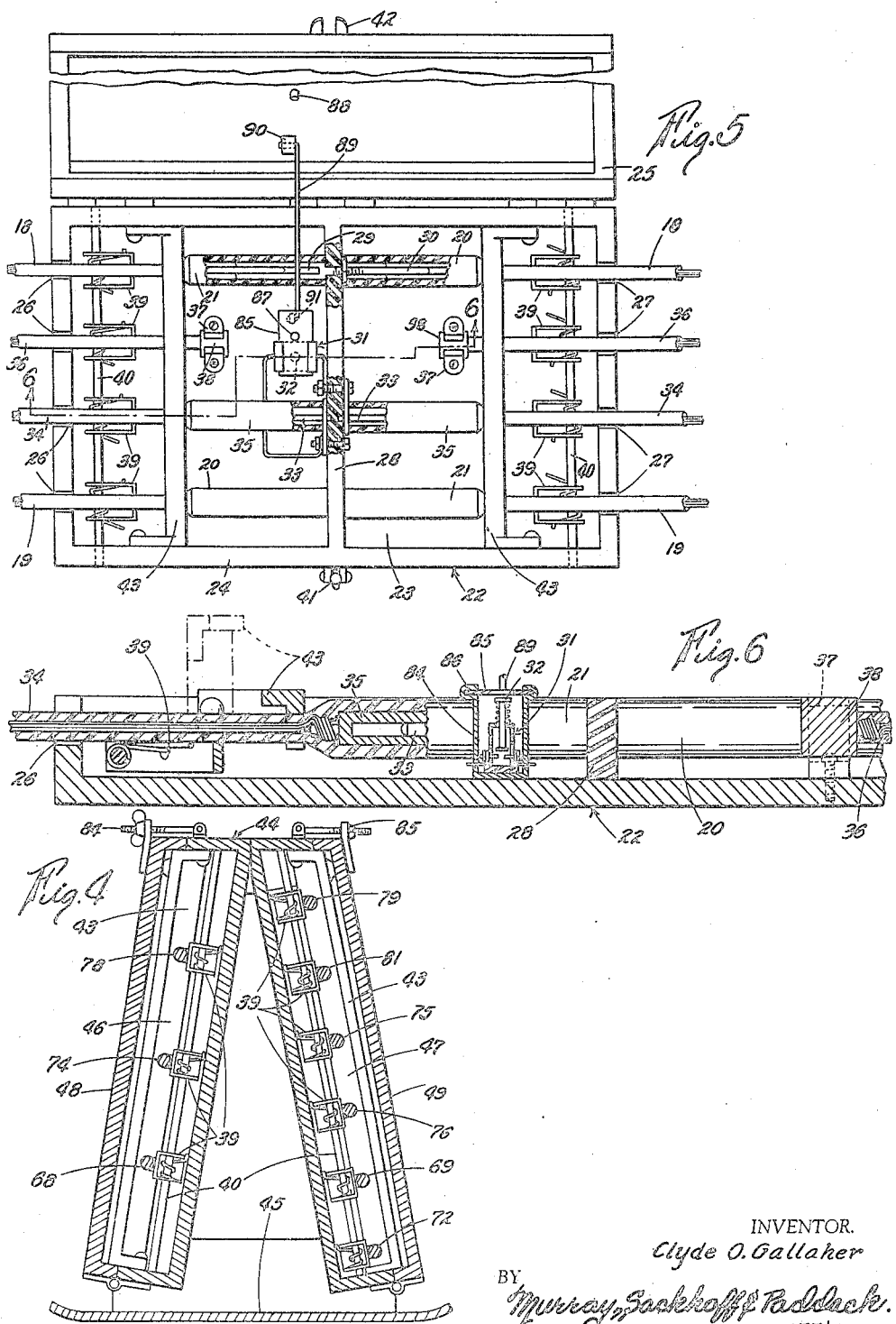

2,492,739

UNITED STATES PATENT OFFICE 2,492,739

SAFETY CONNECTION AND DISTRIBUTION BOX

Clyde O. Gallaher, Thomas, W. Va., assignor to The Electric Railway Equipment Company, Cincinnati, Ohio, a corporation of Ohio Original application August 5, 1943, Serial No. 497,539. Divided and this application February 18, 1947, Serial No. 729,205

5 Claims. (Cl. 175—298)

1

This application is a divisional application of co-pending application Serial No. 497,539, now Patent No. 2,424,812.

The present invention relates to a portable power line extension and power distribution system and has for an object the provision of means whereby such a system is easily and safely established and altered without the use of tools and without the necessity of extending the permanent power lines or permanent feeder lines.

Another object of the invention is to provide a system of insulated cable units and connection and distribution boxes with a pilot or control arrangement whereby relatively high voltage is switched on and off at a safe place, close to the source of current supply for the system, by an automatic and foolproof remote control.

A further object of the invention is to provide connection boxes for the progressive extension of a single set of temporary power lines and a distribution box providing branch circuit connections therefrom to the various pieces of electrical apparatus supplied by the system, said boxes being arranged to preclude the possibility of connecting or disconnecting the conductors in the extended system under closed circuit conditions and thereby also avoiding dangerous arcing and the possibility of injury to operators using the power extension system.

Still another object of the invention is to provide in a system of this kind an arrangement of sectional conductors and connectors whereby improper connections are rendered impossible.

These and other objects are attained by the means herein described and illustrated in the accompanying drawings, in which:

Fig. 1 is a diagrammatic plan view of an extended power line system of the invention.

Fig. 2 is a side elevational view showing the positive line compartment of a distribution box of the invention, in open position, and partly in cross section.

Fig. 3 is a fragmental side elevational view showing the negative line compartment of the distribution box in open position, and partly in cross section.

Fig. 4 is a view taken on line 4—4 of Fig. 2, but showing the compartments of the distribution box in closed condition.

Fig. 5 is a top plan view of a connection box of the invention, with the cover open and partly broken away.

Fig. 6 is a cross-sectional view taken on line 6—6 of Fig. 5.

In general the system employs a contactor switch connected to and located adjacent permanent power lines or other power source, from which switch extend sectional cables with intervening connection boxes to establish a single temporary power extension circuit as required, and a distribution box connected to said extension, and receiving the trailing cables of a plurality of electrical machines as branch circuit connections. The entire system is electrically and mechanically interlocked so that it becomes completely deenergized whenever any of the connections in the system are rendered accessible.

The device of the invention as illustrated, may be most advantageously applied to entry and pillar mining operations where the operations present problems of safety which are not involved elsewhere. In room mining operations the current-consuming motor driven devices are moved farther away from the existing power lines as the cutting and removing operations continue. Where the rooms are very low overhead wiring would be dangerous to use and costly to install. Heretofore, mine machines at the working face were provided with individual sets of power cables which brought them to the working face of the room. Such practice entails dangers due to the multiplicity of cables carrying heavy amperages under load in confined areas. If any of these be overloaded or broken they may ignite explosive gases in poorly ventilated places. Such practice also handicaps operations which involve the successive use of a number of different electrical apparatus. The system of the present invention eliminates these difficulties and hazards.

The invention is not to be understood as limited to mining operations. All manner of temporary or portable power line extensions may be safely set up or removed in a minimum of time without the use of tools.

Referring now to Fig. 1, 10 represents an existing positive power line from which power is to be taken for example, into a low room where coal is to be cut and removed. The negative or return line 11 may be connected to the ground rail in the mine, if desired. The lines 10 and 11 are herein shown diagrammatically as connected to a generator 12 as the source of power supply.

By the means of the present invention a main contactor type switch 13, of suitable design, is disposed closely adjacent supply wires 10 and 11 and is connected to the positive line 10 by a conductor 14 which may have a slip connector 15. Overload protection for the entire system is provided at 15a as by a fuse or other approved means. The main contactor switch 13 is always safely located in a properly ventilated part of the mine where explosive gases are not found in dangerous amounts and by confining any heavy arcing to this location and eliminating it at all remote points along the extended power line system the danger of explosions in the rooms is substantially eliminated. A solenoid coil 16, connected to conductor 14, must be included in a closed circuit before it is energized to draw the moving contactor element 160 into abutment with the spaced apart fixed contacts 17 for carrying current beyond the contactor switch to the extension power circuit of the invention. The extension cable sections 18 and 19 employed are single conductor insulated cables which are made up in convenient lengths, e. g., 100 foot lengths, that can be easily extended into the room. The cable sections 18 and 19 each have at opposite ends a slip connector whereby the cables may be electrically connected in end to end relation through the agency of intermediate members fixedly housed in connection boxes hereinafter described.

The sections 18 and 19 may be identical and interchangeable and each has at its one end a female connector member 20 and at its opposite end a male connector member 21.

The connection boxes

The invention further provides that the several sections of the extended power circuit must be properly connected to fixed connectors disposed in a securely closable connection or distribution box before the circuit is energized. The connection box, indicated generally at 22, comprises a base 23 having a rectangular wall 24 attached thereto. A hingedly connected cover or lid 25 is provided for this box. The wall 24 has slots 26—27 at opposite ends in the edges thereof which receive the cable sections 18 and 19. The connectors 20 and 21, are removably seated lengthwise in the connection boxes. The connector members are preferably non-complementary to each other. Projecting from the opposite faces of a transverse insulating barrier 28 in the connection box 22 are fixed connectors 29 and 30. As can be seen at the top of Fig. 5, the slip connector 20 fits over the fixed male connector 30, while the fixed female connector 29 received the male slip connector 21, thus electrically connecting two positive cable sections 18. The negative cable sections are connected in a reversed, but otherwise similar fashion.

Mounted on the barrier 28 is a spring opened switch indicated at 31, and having a plunger 32 that is spring raised when cover 25 is open, but which is automatically closed when said connection box cover 25 is closed and latched. Switch 31 may be of approved explosion-proof type if desired. A pair of oppositely extending fixed male contacts 33 extend into the box from opposite poles of switch 31 (see Fig. 5). Pilot line sections 34 are adapted to carry a positive potential from solenoid 16 from one connection box 22 to another so long as the switches 31 are closed. The female slip connectors 35 are provided at both ends of each pilot section 34 for removably connecting the positive side of the pilot circuit. The return line for the low amperage pilot circuit is made up of corresponding negative cable sections 19. Removable safety ground connections are provided inside connection boxes 22 and in the distribution box (hereinafter described) in the following manner. U-shaped members 37 are fastened directly to the metal of the connection boxes 22 on opposite sides of the barrier 28 and each of the sections 36 has a strong H-shaped terminal 38 which slides down into the U-shaped member 37 and forms a strong mechanical connection as well as a good safety ground. These connections are relied upon to a considerable extent, in practice, to absorb much of the strain imposed by the occasional necessity of dragging the connected parts of the system over the floor. All cable sections are well insulated and the removable connectors other than 38 are also well insulated on the outside.

Inside the connection boxes are spring raised wire baffles 39 disposed near and in alignment with the several notches 26 and 27 and conveniently supported on cross rods 40. The baffles 39 must be individually pressed down from a normally vertical position to a substantially horizontal position in order to position the several cable sections in the connection box. If one cable is omitted the baffle 39 at that location remains vertical and it becomes impossible to close the cover 25 of the box and thus close switch 39 without the use of some instrument to turn that baffle down. This serves as a precaution against improperly or incompletely fitting up the connections on the several boxes when the extension system is being assembled on the job. Careless or unskilled labor can be safely used for this job insofar as the safety of the workers and the correctness of the installation is concerned.

Simple complementary latch members 41 and 42 are provided on box 22 and cover 25 to secure the latter and thus hold the switch 31 closed. To preclude the spring baffles 39 from raising the cable section in the notches 26 and 27 when the cables are properly connected, hinged yoke bars 43 are provided and these have notches to straddle the several cables just behind the slip connectors. Until yoke bars 43 are seated in the manner indicated the cover of the box cannot be closed to complete the pilot circuit. These yoke bars also preclude the slip connectors from pulling away from the complementary fixed connectors after being properly installed.

If desired the simple mechanical spring baffles 39 may be replaced with self-opening switches connected in series and required to be closed and held down by the properly inserted connectors in order to complete the pilot circuit. The mechanical baffles 39 are preferred from the standpoint of economy and because they render it easier to detect the location of an omitted connection in the system.

The system thus far described affords an easy, rapidly installed and foolproof method and means for extending a single power circuit and a pilot control line as well as a safety ground line which render safe the operation thereof. It will be seen that such a system eliminates the necessity of extending a multiplicity of cables to a number of machines at the working face in a mine.

As will be best understood from Figs. 1, 2, 3 and 4, provision is made for the selective or simultaneos use of one or more electrically driven devices at the end of the extended power circuit.

The distribution box

Distribution box 44 comprises a base plate 45 with two closable compartments, viz: a positive compartment 46 and a negative compartment 47 mounted thereon in inclined relation to each other and these compartments are provided with hinged covers 48 and 49, respectively (see Fig. 4).

The opposite end walls of compartments 46 and 47 are provided with notches or slots 50 arranged to receive various cable sections. The covers 48 and 49 close the open tops of slots 50 when the covers are in closed position.

A pair of pilot switches 51 and 52, which may be of explosion-proof type if desired, are mounted in the bottom portions of compartments 46 and 47, respectively, and are adapted to be independently closed by the closing of covers 48 and 49. Pilot switches 51 and 52 are connected in series by a wire 53, one end of one of said switches (52) being connected to the bus bar 54 in the compartment 47 of distribution box 44, the other side of the other switch (53) being connected with a suitably disposed male connector 33 which is adapted to receive the complementary female connector 35 of a pilot line section 34. A safety ground conductor 36 provides an electrical bond between the metal of the distribution box and the previous connection box in the extended power system. In essentially the same fashion these safety ground conductors 36 are used between each adjacent pair of connection boxes and between the first of a series of connection boxes and the negative supply line 11. As will hereinafter be more fully appreciated, the safety ground return line composed of the conductors 36 and the metallic bases of the intervening boxes must be fully connected throughout.

In providing for branch utility circuits from the endmost connection box 22 to the distribution box 44, a positive cable section 18 has its female connector 20 slidably coupled to a male connector 21 which projects from an insulating barrier 55 in positive compartment 46. A bus bar 56 disposed in the opposite side of the barrier 55 is electrically connected with the last mentioned male connector and the bus bar 56 has suitable number of fuse clips mounted thereon, for example three fuse clips 57, 58 and 59 as shown to accommodate the required fuses 60, 61 and 62. Another insulating barrier 63 has fuse clips 64, 65 and 66 to complete the mounting of fuses 60, 61 and 62 in compartment 46, between the barriers 55 and 63. The several fuses are selected to protect the several current consuming devices which are to receive current from the system. Projecting beyond barrier 63 and connected electrically with fuse clips 64, 65 and 66 are female connectors 200, 201 and 202 of distinctive different sizes so as to receive the individually complementary male connectors 210, 211 and 212, respectively, that are on the free ends of the permanent positive trailing cables of the several machines. This method is adopted in order to make it impossible to connect a machine, e. g., an electric drill of low amperage requirement into a socket fused to pass high amperage intended for another machine such as a coal cutting machine. At this point it should be observed that both the positive and negative trailing cables of all machines to be used with the system of the invention are required to be provided with male and female slip connectors that are polarized with proper female and male connectors which are fixed in the respective compartments 46 and 47 of the distribution box.

As a safety measure, when such further precautions are demanded, the distribution box is arranged to provide for fuses in the negative or return circuits of smaller machines to preclude a grounded circuit in any of the smaller machines from taking the full amperage load of a larger machine. The necessary fuses are received in the negative compartment 47 in substantially the same manner as in the positive compartment.

As shown in Fig. 1, for example, the motor 67 of an electric drill has a permanently attached positive wire 68, the free end of which has the male slip connector 212 attached thereto for removable connection with connector 202 in the positive compartment 46 of the distribution box 44. In a like fashion the motor 67 has a permanent negative wire 69 having a female slip connector 70, for removable connection within negative compartment 47 in circuit with fuse 71. The drill or any other hand tool circuit is thus doubly fused or protected. Motor 67 is further supplied with an insulated safety ground cable 72 with one of the connectors 37 on the end removably connectible in a complementary U-shaped member 37 bolted inside compartment 47.

The motor 73 of a larger machine, such as a mining machine (not shown) has its permanent wires, namely, the positive wire 74, negative wire 75 and safety ground wire 76, removably connectible in the distribution box in a similar manner. The positive male connector 211 on the positive wire or trailing cable 74 serves to assure connection of the device to the properly fused branch circuit. In a like manner negative wire 75 has a slip connector 82 of the female type and safety ground wire 76 has a connector 38 thereon.

The motor 77, of another machine, such as a conveyor has its positive wire 78 permanently attached to male connector 210, while its negative wire 79 has a female connector 80 and safety ground wire 81 has a connector 38 thereon. The compartment 47 has an insulating barrier 83 to which a bus bar 54 is attached, said bus bar being provided with the necessary fuse clips for fuses 71 and 710 and a bus wire 820. Another insulating barrier 830 has mounted on one face the necessary complementary fuse clips, and on its other face the several projecting male connectors which are adapted to receive the slip connectors 70, 82 and 80 on the respective trailing cables of the machines.

Each of the compartments 46 and 47 has two of the hinged yoke bars 43 with the proper number of slots therein to receive the several cable and wire sections and to preclude any of the properly adjusted slip connectors from being pulled loose. The spring raised yokes or baffles 39 are mounted on rods 40 in each end of each compartment, in the same manner and for the same purpose, as explained in connection with the connection boxes 22.

Latches 84 and 85 serve to hold the covers of compartments 46 and 47 tightly closed against the switches 51 and 52.

From the foregoing it will be readily understood that the distance to which the power extension circuit is carried away from the supply 10—11, where the contactor switch 13 is located, may be progressively increased by adding additional connection boxes 22 and the cable sections and by always moving the distribution box 44 to the end of the system and as near as is reasonable to the location of the work to be done by the several current consuming devices supplied by the system.

It will be further noted that if any cable section is omitted, that fact is made immediately apparent by the inability to close the box or boxes in which such cable should be connected. When all the necessary cable sections are properly placed the covers of all boxes must be securely closed in order to complete the pilot circuit which in turn controls the closing of the main contactor switch 13.

Thus the heavy duty motor 73 is supplied in one fused branch circuit, while another motor 71 is connected in a separate fused branch circuit, and still another motor 67 is connected in another fused branch circuit. Under this condition the aforementioned connectors must all be inserted in their respective box compartments before the lids can be closed. When the lids are properly closed, the pilot switches make contact and a complete pilot circuit through pilot lines is established, and the power circuit is energized. It will be understood that in connecting or disconnecting any of the motors it becomes necessary to first open the covers of the distribution box and in opening the first of the two covers, the corresponding pilot switch is automatically opened and the solenoid coil 16 is deenergized, thus allowing the main contactor switch 13 to automatically open and deenergize the entire power circuit. If any preceding connection box is opened, deenergization of switch 13 also occurs.

It is impossible for an operator to disconnect from the system any piece of apparatus under his control save by opening the compartments of the distribution box. After one cover is loosened, the entire supply circuit is deenergized, as aforesaid, and the operator may safely withdraw the connectors from the compartment. When the connectors are out of the box, the spring yokes preclude accidental closing of the box lid which would energize the pilot circuit and thus close the contactor at the power source, which in turn energizes the power circuit of the system.

Overload protection for the branch circuits is attained preferably by providing for the use of standard fuses. The connectors are polarized to obviate improper circuits. In practice, I accomplish this polarization by the simple expedient of using different diameters of pin and socket metal in the different mating pairs of connectors. By so doing and by arranging for a fuse of given ampere rating with a given diameter of metal, the branch cables and the box may be readily designed to the use of any predetermined maximum number of branch outlets, the total of which is predetermined to avoid overloading the extension system or its source of electrical supply.

The boxes and power extension system of the invention are advantageous in many ways both from the standpoint of economy in establishing temporary circuits of any desired length and in the matter of safety. Room mining is usually done under a minimum low ceiling, and the hereinbefore described equipment may be distributed with entire safety against accidental separation of the connectors which are always housed inaccessibly in the connection and distribution boxes so long as any machine is connected in the circuit. The cable sections are all of the heavy insulated and well protected type to afford maximum protection against breakage for these power lines. The pilot cable sections carry very low amperage and are of lighter weight cable. If the boxes be dragged along the floor, the strain imposed is taken up by the heavier cables. Should pilot circuit 33 be broken by severing the line, only a minimum arc can result, and the entire circuit is forthwith deenergized because solenoid 16 is instantly deenergized.

In the herein described embodiment of the invention the connection boxes and the distribution box are provided with a foolproof safeguard against any possible closing of any pilot switch while the cover of its box is open. The pilot switches 31, 51 and 52 in the several boxes and compartments are alike so that a description of one will suffice for all.

Reference is made to Fig. 6 wherein the switch 31 is shown mounted within a casing 84 with a slidable cover 85 mounted in opposed grooved flanges 86 on casing 84. Cover 85 has a perforation 87 (see Fig. 5) which must be in registry with the plunger 32 of the switch in order to depress the said plunger to close the switch. On the inside face of the cover 25 of the box is a lug or finger 88 which passes through the registered perforation 85 to depress the switch plunger only when the box cover is fully closed. A link 89 is pivoted to the inside of box cover 25 at 90 and to the slide cover 85 at 91. Both ends of the link are desirably upset or burred over on the ends in any well known manner to prevent removal. When the cover 25 is swung open the link pulls slide cover 85 to a position wherein the top of the casing is covered by the imperforate part of slide cover 85. It is thus made impossible to accidentally or otherwise close the pilot switch to endanger persons working on the system. On fully closing of the box cover 25 the link automatically pushes the slide cover to a position wherein the lug 88 may pass through perforation 87 for automatically closing the pilot switch.

The operation of the system has been described in connection with the foregoing disclosure and will be readily understood without further explanation.

What is claimed is:

1. A connection box for a portable power extension system comprising a metallic box structure, a cover hinged thereto, means to latch the cover in closed position, a spring opened pilot switch closable by the cover when said cover is in closed position, a fixed connector on each side of the switch adapted for the reception of pilot line connectors within the box whereby a pilot circuit is completed only upon securely closing the cover, said box having notches at opposite ends for the freely removable reception of insulated cables having connectors, fixed connectors in the box for the removable reception of said cable connectors, means movably mounted within the box for selectively retaining the cable connectors against removal from the fixed connectors in the box and a plurality of members biased to upright operative position in the box for jointly and severally precluding closing of said cover, said members being disposed between the respective fixed connectors and the opposed notches in the end wall and adapted to be moved to and held inoperative respectively by the several cables when the slip connectors on the cables are mounted on the fixed connectors.

2. A distribution box for a safety power extension system comprising a base, a pair of metallic compartment structures mounted thereon, independent covers for said compartments, a spring opened pilot switch in each compartment closable by closing of a cover of said compartment, said compartments each having a pair of spaced-apart insulating barriers intermediate opposite ends, a bus bar on one of said barriers, a plurality of fuse clips on said bus bar, a plurality of complementary fuse clips on the remaining barrier opposite said bus bar, a fixed connector electrically connected with the bus bar, independent fixed connectors electrically connected with the fuse clips and a fixed connector electrically connected with one side of the pilot switch in one of the compartments, the pilot switch in the other compartment connected at its one side with the pilot switch in the first mentioned compartment, and at its other side with the bus bar in the said other compartment.

3. A distribution box for a safety power extension system comprising a base, a pair of metallic compartment structures mounted thereon, independent covers for said compartments, a spring opened pilot switch in each compartment closable by closing of a cover of said compartment, slide cover members on the pilot switches actuated by said compartment covers for rendering the switches inaccessible for accidental closing when the respective compartment covers are open, said compartments each having a pair of spaced-apart insulating barriers intermediate opposite ends, a bus bar on one of said barriers, a plurality of fuse clips on said bus bar, a plurality of complementary fuse clips on the remaining barrier opposite said bus bar, a fixed connector electrically connected with the bus bar, independent fixed connectors electrically connected with the fuse clips and a fixed connector electrically connected with one side of the pilot switch in one of the compartments, the pilot switch in the other compartment connected at its one side with the pilot switch in the first mentioned compartment, and at its other side with the bus bar in the said other compartment.

4. In a cover closable box of the class described the combination of a pilot switch mounted in the box, means on the cover to actuate the switch when the said cover is closed, a housing about said switch including a slide cover having an aperture adapted to register with the switch and pass the switch closing means on box cover, and link means connecting the box cover and slide cover whereby the switch is rendered wholly inaccessible beneath the non-apertured portion of said slide cover.

5. A connector box for a safety portable power extension system comprising side walls and notched end walls, a cover for the box, a transverse barrier in the box, a plurality of fixed connectors extending directly through the barrier opposite certain of the notches in said end walls and adapted at both ends for the reception of removable slip connectors having cables attached thereto with the cables freely and removably seated in the notches in the end walls, a pair of additional fixed connectors extending respectively from opposite faces of the barrier and adapted for reception of slip connectors on additional cables that are removably seated in certain notches in the opposed end walls respectively, a hinged member in each end of the box adapted to be raised for permitting mounting and removal of all of the slip connectors on and from the fixed connectors and adapted in raised position to preclude closing of the cover, independent members biased to upright position intermediate each fixed connector and an opposed notch in the adjacent end wall for jointly and severally precluding closing of the cover, said members individually rendered inoperative by a cable seated in the adjacent notch in the end wall, and a spring opened pilot switch closable by the cover and electrically connected in series with the said pair of additional fixed contacts.

CLYDE O. GALLAHER.

REFERENCES CITED

The following references are of record in the file of this patent:

UNITED STATES PATENTS

| Number | Name | Date |
|---|---|---|
| 459,523 | Keller et al. | Sept. 15, 1891 |
| 1,017,110 | Rogers | Feb. 13, 1912 |
| 1,402,297 | Kellner | Jan. 3, 1922 |
| 1,453,696 | Ball et al. | May 1, 1923 |
| 1,992,392 | Rah et al. | Feb. 26, 1935 |
| 2,280,334 | Workman | Apr. 21, 1942 |
| 2,317,667 | Chandler | Apr. 27, 1943 |
| 2,339,496 | Madeira | Jan. 18, 1944 |
| 2,422,755 | Strother | June 24, 1947 |
| 2,439,708 | Abraham | Apr. 13, 1948 |

FOREIGN PATENTS

| Number | Country | Date |
|---|---|---|
| 817,924 | France | June 7, 1937 |